United States Patent
Hwang et al.

(10) Patent No.: US 10,051,337 B2
(45) Date of Patent: Aug. 14, 2018

(54) METHOD AND SYSTEM FOR MANAGING AN ENCRYPTION KEY FOR A BROADCASTING SERVICE

(75) Inventors: Sung-Oh Hwang, Yongin-si (KR); Sergey Nikolayevich Seleznev, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 185 days.

(21) Appl. No.: 13/638,953

(22) PCT Filed: Apr. 1, 2011

(86) PCT No.: PCT/KR2011/002290
§ 371 (c)(1),
(2), (4) Date: Oct. 2, 2012

(87) PCT Pub. No.: WO2011/122912
PCT Pub. Date: Oct. 6, 2011

(65) Prior Publication Data
US 2013/0024701 A1  Jan. 24, 2013

(30) Foreign Application Priority Data

Apr. 2, 2010 (KR) .............. 10-2010-0030632
Jun. 21, 2010 (KR) .............. 10-2010-0058744

(51) Int. Cl.
*H04L 29/06* (2006.01)
*H04N 21/6377* (2011.01)
(Continued)

(52) U.S. Cl.
CPC ..... *H04N 21/63775* (2013.01); *H04L 9/0643* (2013.01); *H04L 9/083* (2013.01);
(Continued)

(58) Field of Classification Search
CPC .............. G06F 21/10; H04L 2463/101; H04L 2209/603; H04L 9/0822
See application file for complete search history.

(56) References Cited

U.S. PATENT DOCUMENTS 6,295,359 B1 *  9/2001  Cordery et al. ............... 380/44
6,675,178 B1 *  1/2004  Chinchar et al. ............. 707/655
(Continued)

FOREIGN PATENT DOCUMENTS

CN  101097588  1/2008
EP  2 288 071  2/2011
(Continued)

OTHER PUBLICATIONS

Arei Kobayashi et al., "An Improved Method of XML Document Encoding with Uniformed Sheet 'XEUS'", IPSJ SIG Technical Report, Sep. 22, 2005.
(Continued)

*Primary Examiner* — Farid Homayounmehr
*Assistant Examiner* — Christopher C Harris
(74) *Attorney, Agent, or Firm* — The Farrell Law Firm, P.C.

(57) ABSTRACT

A system and method for managing an encryption key are provided, which include receiving, from a DRM agent, an RO request message for receiving content; generating a KSP including a first key and a second key; applying hash chains with different directions to the first key and to the second key to generate an encryption key for the content; and transmitting, to the DRM agent, a response message including a context element having an identifier of the content and a key information element. The key information element includes a first encryption key element; a rights encryption key information element; and an encryption data element.

10 Claims, 8 Drawing Sheets

(51) Int. Cl.
  *H04L 9/06* (2006.01)
  *H04L 9/08* (2006.01)
  *H04N 21/254* (2011.01)
  *H04N 21/266* (2011.01)
  *H04N 21/4623* (2011.01)
  *H04N 21/4627* (2011.01)

(52) U.S. Cl.
  CPC ............ *H04L 9/0869* (2013.01); *H04L 63/06* (2013.01); *H04L 63/12* (2013.01); *H04N 21/2541* (2013.01); *H04N 21/26606* (2013.01); *H04N 21/26613* (2013.01); *H04N 21/4623* (2013.01); *H04N 21/4627* (2013.01); *H04L 2209/38* (2013.01); *H04L 2209/603* (2013.01)

(56) References Cited

U.S. PATENT DOCUMENTS

| | | | |
|---|---|---|---|
| 2005/0265555 A1* | 12/2005 | Pippuri ........................ | 380/284 |
| 2005/0267845 A1* | 12/2005 | Oh et al. .................... | 705/51 |
| 2006/0136339 A1* | 6/2006 | Kim et al. ................... | 705/51 |
| 2007/0168293 A1* | 7/2007 | Medvinsky .................. | 705/57 |
| 2007/0265970 A1 | 11/2007 | Kahn et al. | |
| 2008/0015888 A1* | 1/2008 | Dang et al. .................. | 705/1 |
| 2008/0046758 A1* | 2/2008 | Cha et al. ................... | 713/189 |
| 2008/0047006 A1* | 2/2008 | Jeong et al. ................. | 726/21 |
| 2008/0065548 A1* | 3/2008 | Muijen ....................... | 705/51 |
| 2008/0072296 A1* | 3/2008 | Bensimon et al. ........... | 726/4 |
| 2008/0219436 A1* | 9/2008 | Chen et al. ................. | 380/30 |
| 2008/0307530 A1* | 12/2008 | Lee et al. .................... | 726/26 |
| 2009/0019530 A1* | 1/2009 | Keeler et al. ................ | 726/4 |
| 2009/0163137 A1* | 6/2009 | Capparelli et al. .......... | 455/3.06 |
| 2009/0252324 A1* | 10/2009 | Seleznev et al. ............. | 380/200 |
| 2010/0205439 A1* | 8/2010 | Chu et al. ................... | 713/169 |
| 2011/0096929 A1 | 4/2011 | Seleznev et al. | |
| 2011/0206205 A1 | 8/2011 | Seleznev et al. | |
| 2013/0007894 A1 | 1/2013 | Dang et al. | |
| 2013/0030906 A1 | 1/2013 | Hwang et al. | |
| 2013/0067230 A1 | 3/2013 | Kim | |

FOREIGN PATENT DOCUMENTS

| | | |
|---|---|---|
| JP | 2002-252608 | 9/2002 |
| JP | 2009-238212 | 10/2009 |
| KR | 1020050114187 | 12/2005 |
| KR | 1020090106361 | 10/2009 |
| KR | 1020090128862 | 12/2009 |
| WO | WO 2008/000639 | 1/2008 |
| WO | WO 2009/145495 | 12/2009 |
| WO | WO 2009/151277 | 12/2009 |
| WO | WO 2009/151281 | 12/2009 |
| WO | WO 2009151277 A2 * | 12/2009 |
| WO | WO 2011/122913 | 10/2011 |

OTHER PUBLICATIONS

Arei Kobayashi et al., "Advanced Road Traffic Information Delivery System using Terrestrial Digital Broadcasting to Mobile Terminals", IEICE Technical Report, Feb. 13, 2006.

PCT/ISA/237 Written Opinion issued on PCT/KR2011/002290 (pp. 5).

PCT/ISA/210 Search Report issued on PCT/KR2011/002290 (pp. 4).

Open Mobile Alliance, DRM Specification, Draft Version 2.1, OMA-TS-DRM-DRM-V2_1-20080704-D, Jul. 4, 2008.

Chinese Office Action dated Oct. 17, 2014 issued in counterpart application No. 201180025813.0.

* cited by examiner

```
<o-ex:asset>
  <o-ex:context>
   <o-dd:uid>ContentID</o-dd:uid>
  </o-ex:context>
  <ds:KeyInfo>
   <xenc:EncryptedKey>
    <xenc:EncryptionMethodAlgorithm="http://www.w3.org/2001/04/xmlenc#kw-aes128"/>
    <ds:KeyInfo>
     <ds:RetrievalMethod URI="REKReference"/>
    </ds:KeyInfo>
    <xenc:CipherData>
       <xenc:CipherValue>EncryptedSeeds</xenc:CipherValue>
     </xenc:CipherData>
   </xenc:EncryptedKey>
  </ds:KeyInfo>
</o-ex:asset>
```

FIG.3

| Value | Length (bits) | Encoding |
|---|---|---|
| KSP Reference Length | 8 | uimsbf |
| AVP Reference Length | 8 | uimsbf |
| TEK Reference Length | 8 | uimsbf |
| Reserved Bits | 7 | uimsbf |
| KSP Reference | 8*KSP Reference Length | uimsbf |
| AVP Reference | 8*AVP Reference Length | uimsbf |
| Number of TEKs | 16 | uimsbf |
| Seed Type | 1 | uimsbf |
| TEK Reference | 8*TEK Reference Length | uimsbf |
| if ( Key Seed Type == 0 ) { | | |
| Key Seed Length | 8 | uimsbf |
| } | | |
| if ( Key Seed Type == 1 ) { | | |
| Key Seed Length | 8 | uimsbf |
| Salt Seed Length | 8 | uimsbf |
| } | | |

FIG.4

```
<!-- Rights Object Definitions -->
<complexType name="ROPayload">
  <sequence>
    <element name="riID" type="roap:Identifier"/>
    <element name="rights" type="o-ex:rightsType"/>
    <element name="signature" type="ds:SignatureType" minOccurs="0"/>
    <element name="timeStamp" type="dateTime" minOccurs="0"/>
    <element name="encKey" type="xenc:EncryptedKeyType"/>
    <element ref="roap:roPayloadAliases" minOccurs="0'/>
    <element name="MulticastConfData" type="base64Binary" minOccurs="0">
    <any processContents="lax" minOccurs="0" maxOccurs="unbounded"/>
  </sequence>
  <attribute name="version" type="roap:Version" use="required" />
  <attribute name="id" type="ID" use="required" />
  <attribute name="stateful" type="boolean"/>
  <attribute name="domainRO" type="boolean"/>
  <attribute name="riURL" type="anyURI"/>
</complexType>
```

FIG.5

| Element | <!ELEMENT xenc:EncryptedKey (xenc:EncryptionMethod, ds:KeyInfo?, xenc:CipherData, o-dd:MulticastConfData)> |
|---|---|
| Semantics | The <EncryptedKey> element contains the optional <KeyInfo> element, the <EncryptionMethod> element, and the <CipherData> element |

FIG.6

| Element | <!ELEMENT o-dd:MulticastConfData (#PCDATA)> |
|---|---|
| Semantics | The <MulticastConfData> element contains the base64 encoded value of the multicast encryption configuration data (see above). |

FIG.7

```
<element name="MulticastConfData">
  <complexType>
    <sequence>
      <element name="kspReference" type="base64Binary"/>
      <element name="avpReference" type="base64Binary"/>
      <element name="tekReference" type="base64Binary"/>
      <element name="numberTeks" type="base64Binary"/>
      <element name="seedType" type="boolean"/>
      <element name="encrSeedLength" type="base64Binary"/>
      <element name="authSeedLength" type="base64Binary" minOccurs="0">
    </sequence>
  </complexType>
</element>
```

FIG.8

| Element | <!ELEMENT o-dd:MulticastConfData ()> |
|---|---|
| Semantics | The <MulticastConfData> element contains configuration data of the multicast encryption configuration data (see below attributes). |

FIG.9

| Element | <!ATTLIST o-dd:Multicast oma-dd:numberTeks CDATA #REQUIRED> |
|---|---|
| Semantics | The numberTeks attribute contains a non-negative integer value. It specifies the number of TEKs to be generated from the provisioned seed values. |

FIG.10

| Element | <!ELEMENT o-ex:asset (o-ex:context?, o-ex:inherit?, o-ex:digest?, ds:KeyInfo?, o-ex:MulticastConfData)> |
|---|---|
| Semantics | The <asset> element specifies the identity of the DRM Content governed by the containing <agreement> element via the <context> child element.<br>The optional <inherit> element instructs the DRM Agent to apply the rights from the inherited Rights Object, specified in the <inherit> element context, to this asset. Note that the <KeyInfo> element SHOULD be omitted if the Rights Object functions as a parent Rights Object in the inheritance case.<br>The optional <digest> element provides integrity protection for the reference to the DRM Content.<br>The optional <KeyInfo> element provides the functionality to access the DRM content if granted the rights to do so.<br>The optional <MulticastConfData> element provides functionality to access the multicast DRM content that is protected with the multicast key management mechanism specified in section 5.8.3.<br>The <asset> element enables expression linking via its "id" and "idref" attributes. This enables reuse of Permissions defined for one asset, for other assets inside the same Rights Object. When the <asset> element is contained in a <permission> element, it MUST contain an "idref" attribute, and MUST be empty, i.e., all its optional child elements MUST be omitted. |

FIG.11

| Element | <!ELEMENT o-ex:MulticastConfData (#PCDATA)> |
|---|---|
| Semantics | The <MulticastConfData> element contains the base64 encoded value<br>The <MulticastConfData> element contains the base64 encoded value<br>Encoding of this data is defined in section 7.4 of [DRM-v2.2]. |

FIG.12

```
<complexType name="MulticastKeyGeneration">
  <complexContent>
    <extension base="roap:Extension"/>
    </extension>
  </complexContent>
</complexType>
```

FIG.13

```
<complexType name="MulticastKeyGeneration">
  <complexContent>
    <extension base="roap:Extension"/>
      <element name="supportedHashAlgorithm" type="anyURI"/ minOccurs="0"
maxOccurs="unbounded">
    </extension>
  </complexContent>
</complexType>
```

FIG.14

```
<complexType name="MulticastKeyGeneration">
  <complexContent>
    <extension base="roap:Extension"/>
      <element name="selectedHashAlgorithm" type="anyURI"/ minOccurs="0">
    </extension>
  </complexContent>
</complexType>
```

FIG.15

METHOD AND SYSTEM FOR MANAGING AN ENCRYPTION KEY FOR A BROADCASTING SERVICE

PRIORITY

This application is a National Phase Entry of PCT International Application No. PCT/KR2011/002290, which was filed on Apr. 1, 2011, and claims priority to Korean Patent Application Serial Nos. 10-2010-0030632 and 10-2010-0058744, which were filed in the Korean Intellectual Property Office on Apr. 2, 2010 and Jun. 21, 2010, respectively, the entire content of each of which is incorporated herein by reference.

BACKGROUND OF THE INVENTION

1. Field of the Invention

The present invention relates generally to a broadcasting service, and more particularly, to a method of managing a key used for encrypting a broadcasting service where a plurality of users exists.

2. Description of the Related Art

Recently, a mobile communication system has been developed to provide various multimedia services to users. Accordingly, there is lively discussion on a broadcast service and a multicast service to provide various content to users. Hereinafter, the broadcast and multicast service may be referred to as a "broadcasting service".

The term broadcasting service refers to a point-to-multipoint service in which multimedia data such as image data or video data is transmitted from a single source object to a plurality of receivers in a service area through use of a unidirectional bearer service. The broadcasting service may support a broadcast mode and a multicast mode. In the broadcast mode, data is broadcasted to all users in a corresponding service area. Conversely, for the multicast service, a user subscribes to a predetermined broadcasting service or a predetermined broadcasting service group where a Service Provider (SP) exists.

However, data of the broadcasting service may be encrypted and transmitted so that the data is transferred to users who have subscribed to the broadcasting service. Consequently, the data that is encrypted and transmitted will need to be decrypted by the user. Therefore, an encryption key used when the SP encrypts the data is also shared with the user.

An encryption key used in a current Open Mobile Alliance (OMA) Digital Rights Management (DRM) system may be a single encryption key, i.e., a Content encryption Key (CEK), and when the encryption key is used in the broadcasting service, the encryption key may need to be one-to-one transmitted to users of the broadcasting service. Because the method performs one-to-one management on a CEK between a system and a terminal, the method may not flexibly manage an encryption key in a broadcasting service that a plurality of users subscribe to and withdraw from during a service time. That is, an encryption key that is used every time that a user requests a service and withdraws from the service will be continuously updated. In this process, overload on a bidirectional network often occurs.

Therefore, a need exists for a method that effectively transfers a key required for decrypting content by effectively utilizing a one-to-one bidirectional channel and a broadcasting channel.

SUMMARY OF THE INVENTION

Therefore, the present invention has been made in view of the above-mentioned problems, and an aspect of the present invention is to provide a method and a system that manages an encryption key for a broadcasting service that supports a point-to-multipoint service.

In accordance with an aspect of the present invention, there is provided method for a Rights Issuer (RI) to manage an encryption key to selectively provide content to a Digital Rights Management (DRM) agent in a broadcasting service that transmits the content to a plurality of DRM agents. The method includes receiving, from the DRM agent, a message requesting a rights object for receiving the content divided into at least one section; generating a Key Seed Pair (KSP) including a first key and a second key; applying hash chains of different directions to the first key and the second key, respectively, to generate at least one encryption key associated with each of the at least one section; and transmitting, to the DRM agent, a response message including a context element including an identifier of the content and a key information element. The key information element includes a first encryption key element including information associated with the at least one encryption key, a rights encryption key information element including information associated with a reference of a rights encryption key, and a cipher data element including an encrypted seed.

In accordance with another aspect of the present invention, there is provided a method for a Rights Issuer (RI) to manage an encryption key to selectively provide content to a Digital Rights Management (DRM) agent in a broadcasting service that transmits the content to a plurality of DRM agents. The method includes receiving, from the DRM agent, a message requesting a rights object for receiving the content divided into at least one section; generating a Key Seed Pair (KSP) including a first key and a second key; applying hash chains of different directions to the first key and the second key, respectively, to generate at least one encryption key associated with each of the at least one section; and transmitting, to the DRM agent, a response message including a context element including information associated with a rights object corresponding to the content and a multicast configuration data element including information associated with the at least one encryption key of the content transmitted by a multicast, through use of a rights encryption language.

In accordance with another aspect of the present invention, there is provided a method for a Digital Rights Management (DRM) agent to manage an encryption key provided from a Rights Issuer (RI) to use encrypted content in a broadcasting service that transmits content to a plurality of DRM agents. The method includes transmitting, to the RI, a message requesting a rights object for receiving the content divided into at least one section; receiving, from the RI, a response message including a context element including an identifier of the content and a key information element including encryption key information for decrypting the content; determining the identifier of the content from the context element; determining, from the key information element, a first encryption key element including information associated with the encryption key, a rights encryption key information element including information associated with a rights encryption key reference, and a cipher data element including an encrypted seed; determining, from the key information element, a Key Seed Pair (KSP) included in the encryption key, the KSP including a first key and a second key, which are different from each other; and applying hash chains of different directions to the first key and the second key, respectively, to decrypt at least one encryption key associated with each of the at least one section.

In accordance with another aspect of the present invention, there is provided a method for a Digital Rights Management (DRM) agent to manage an encryption key provided from a Rights Issuer (RI), to use encrypted content in a broadcasting service that transmits content to a plurality of DRM agents. The method includes transmitting, to the RI, a message requesting a rights object for receiving the content divided into at least one section; receiving, from the RI, a response message including a context element including information associated with a rights object corresponding to the content and a multicast configuration data element including information associated with an encryption key of the content transmitted by a multicast, through use of a rights encryption language; determining an identifier of the content from the context element; determining information associated with the encryption key of the content transmitted by the multicast from the multicast configuration data element; determining a Key Seed Pair (KSP) included in the multicast configuration data element, the KSP including a first key and a second key, which are different from each other; and applying hash chains of different directions to the first key and the second key, respectively, to decrypt at least one encryption key associated with each of the at least one section.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 3 illustrates a data configuration of a response message used for an encryption key managing method of a broadcasting service according to an embodiment of the present invention;

FIG. 4 illustrates an encrypted seed provided in a binary data structure used for an encryption key managing method of a broadcasting service according to an embodiment of the present invention;

FIG. 5 illustrates an encrypted seed encoded by eXtensible Markup Language (XML) elements, the encrypted seed being provided in the binary data structure of FIG. 4;

FIG. 6 illustrates an example of an encryption key (Encryptedkey) element as illustrated in FIG. 5;

FIG. 7 illustrates an example of a multicast configuration data (MulticastConfData) as illustrated in FIG. 5;

FIG. 8 illustrates an example of a multicast configuration data (MulticastConfData) element included in a cipher data (Cipherdata) element as illustrated in FIG. 3;

FIG. 9 illustrates an example of a multicast configuration data (MulticastConfData) element included as illustrated in FIG. 8;

FIG. 10 illustrates an example of an element associated with a number of Traffic Encryption Keys (TEKs) as illustrated in FIG. 9;

FIG. 11 illustrates a data configuration of a response message used in an encryption key managing method of a broadcasting service according to an embodiment of the present invention;

FIG. 12 illustrates an example of a multicast configuration data (MulticastConfData) element included as illustrated in FIG. 11;

FIG. 13 illustrates an example of a signaling used in an encryption key managing method of a broadcasting service according to an embodiment of the present invention;

FIG. 14 illustrates another example of a signaling used in an encryption key managing method of a broadcasting service according to an embodiment of the present invention;

FIG. 15 illustrates another example of a signaling used in an encryption key managing method of a broadcasting service according to an embodiment of the present invention;

DETAILED DESCRIPTION OF EMBODIMENTS
OF THE INVENTION

Hereinafter, various embodiments of the present invention will be described with reference to the accompanying drawings. In the following description, a detailed description of known functions and configurations incorporated herein will be omitted when it may make the subject matter of the present invention rather unclear. Also, the terminologies used in the description may be defined based on corresponding functions in the present invention, which will be changed based on the intention of an operator, practices, and the like.

Figure 1:
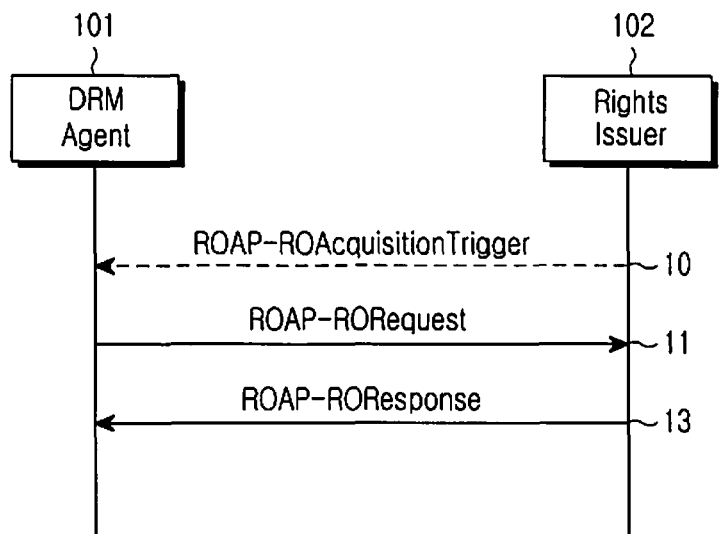
FIG. 1 is a signal flow diagram illustrating an encryption key managing method of a broadcasting service according to an embodiment of the present invention.

FIG. 1 is a signal flow diagram illustrating an encryption key managing method of a broadcasting service according to an embodiment of the present invention.

Referring to FIG. 1, the encryption key managing method of the broadcasting service may be performed by a DRM agent 101 and a Rights Issuer (RI) 102. For example, the DRM agent 101 may be included in a terminal that receives content provided through a broadcasting service. The RI 102 may be included in a server that provides content. The RI 102 issues a Rights Object (RO) associated with content so as to selectively provide the content to the allowed DRM agent 101, and provides the content to the DRM agent 101.

In step 11, the DRM agent 101 transmits a message to the RI 102, requesting a rights object in order to receive content divided into at least one section. For example, in FIG. 1, the message transmitted to the RI 102 in step 11 is a Rights Object Acquisition Protocol (ROAP) RO request (ROAP-ROrequest) message that is generated based on a ROAP defined in the OMA DRM standard.

In addition, the DRM agent 101 may voluntarily transmit a message requesting the RO, or may transmit a message requesting the RO in response to a trigger message received from the RI 102, indicating as issuing by the RI 102. For example, in step 10 of FIG. 1, a ROAP RO Acquisition Trigger (ROAP-ROAcquisitionTrigger) message is generated based on the ROAP defined in the OMA DRM standard.

In step 13, the RI 102 generates a response message in response to the message requesting the RO, and transmits the response message to the DRM agent 101. For example, in FIG. 1, the response message is a ROAP RO response (ROAP-ROresponse) message that is generated based on the ROAP defined in the OMA DRM standard.

To encrypt content transmitted to the DRM agent 101, the RI 102 may generate a pair of seed keys, which are referred to herein as a Key Seed Pair (KSP). The KSP includes KS1 and KS2. The KSP may be randomly generated by the RI 102. Subsequently, a hash chain may be applied to KS1 and KS2. That is, a forward directional hash chain may be applied to KS1, and a reverse directional hash chain may be applied to KS2, to generate a Bidirectional Hash Pair (BHP) (Si,Mi).

More specifically, S1 is calculated by applying a hash function to KS1, and S2 is calculated by applying the hash function again to S1. In the same manner, up to Sn may be calculated. The reverse hash chain may proceed in a reverse direction from the forward directional hash chain. That is, Mn is calculated by applying the hash function to KS2, and Mn−1 is calculated by applying the hash function to Mn. In this manner, up to M1 may be calculated by applying the hash function to M2. Through this process, n pairs of (Si, Mi) may be generated, where a pair of (Si, Mi) is defined as a BHP.

Subsequently, n encryption keys, i.e., Traffic Encryption Keys (TEKs), are calculated by performing predetermined operations with respect to n BHPs. For example, an exclusive-OR operation may be used, as shown Equation (1).

$$TEK_i = S_i \text{ XOR } M_i \qquad \text{Equation 1}$$

Basically, a pair of KSPs (KS1, KS2) is generated, n pairs of BHPs (Si, Mi) are generated from the KSPs, and n TEKs are generated from the n pairs of BHPs (Si, Mi).

In addition, when the DRM agent 101 supports Pay-Per-View (PPV), the KSP may not be used and there may be a slight difference. That is, the RI 102 may calculate an Access Valid Pair (AVP) as opposed to the KSP. Subsequently, the RI 102 transmits the AVP to the DRM agent 101 that supports the PPV. The AVP may refer to a pair of (Si, Mj) information corresponding to a predetermined time period where a broadcasting service is provided to the PPV terminal. The DRM agent 101 that supports the PPV may apply a forward directional hash chain to the Si so as to obtain values up to Sj, and may apply a reverse directional hash chain to the Mj so as to obtain values up to Mi. That is, the DRM agent 101 that supports the PPV may generate m pairs of BHPs from the AVP. For example, when a number of BHPs generated from the DRM agent 101 is m, m=j−i+1. Accordingly, the DRM agent 101 that supports the PPV may calculate m TEKs through use of the m BHPs.

Therefore, RI 102 transmits KSP=(KS1, KS2) or AVP=(Si, Mj) to the DRM agent 101. Although both have different names, they are substantially the same in that they are information associated with data encryption during a time period of a broadcasting service provided to the DRM agent 101. That is, when information associated with data encryption at a starting point of a reference period of the broadcasting service is KS1, and information associated with data encryption at an ending point is KS2, Si may indicate information associated with data encryption at a starting point in a time period included in the reference period and Mj may indicate information associated with data encryption at an ending point in the time period.

For example, when a user purchases a monthly pass for the broadcasting service, the DRM agent 101 of the user who purchases the monthly pass is regarded as a subscriber DRM agent 101. In this example, the KSP transmitted from the DRM agent 101, i.e., (KS1, KS2), indicates information associated with data encryption at a starting point and an ending point of a corresponding month. When the user purchases a pass for one episode of a soap opera, the AVP transmitted to the DRM agent 101 of the user, i.e., (Si, Mj), indicates information associated with data encryption at a starting point and an ending point of the soap opera.

In the descriptions provided above, a "pair" of KSP information is used. However, a single piece of information, i.e., one of KS1 and KS2, may be used for a subscriber terminal. When two pieces of information are not used, the used information may not need to be distinguished by a subscript, and may be referred to merely as KS. The KS is information associated with data encryption at a starting point or an ending point of a subscription period. That is, when a reverse directional hash chain is applied to the KS, the KS may indicate information associated with data encryption at an ending point of a broadcasting service. When a forward directional hash chain is applied to the KS, the KS may indicate information associated with data encryption at a starting point of the broadcasting service.

Figure 2:
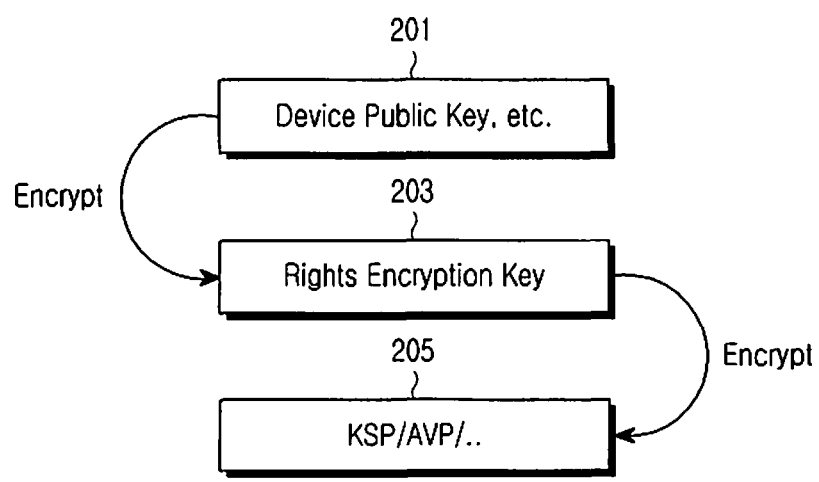
FIG. 2 illustrates a key layer applied to an encryption key managing method of a broadcasting service according to an embodiment of the present invention.

FIG. 2 illustrates a key layer applied to an encryption key managing method of a broadcasting service according to an embodiment of the present invention.

Referring to FIG. 2, a key layer applied to a DRM system includes a device public key 201, a Rights Encryption Key (REK) 203, and a KSP/AVP 205. A sensitive portion of an RO may be secured by the REK 203. As defined in the OMA DRM, the REK 203 is encrypted based on a device public key or a domain key. Accordingly, the RO may be accessed by a predetermined device or a predetermined device group. The KSP/AVP 205 described herein may be encrypted by the REK in the same manner as defined in a Content Encryption Key (CEK).

FIG. 3 illustrates a data configuration of a response message used for an encryption key managing method of a broadcasting service according to an embodiment of the present invention. Specifically, FIG. 3 illustrates an example of a data configuration of an RO response message as transmitted in step 13 of FIG. 1.

Referring to FIG. 3, the RO response message includes a context element including an identifier (ContentID) of content, and a key information (KeyInfo) element.

The key information (KeyInfo) element includes a first encryption key (EncryptedKey) element including information associated with the encryption key, an REK information (KeyInfo) element including information associated with an REK, and a cipher data element including information associated with an encrypted seed (EncryptedSeeds).

The first encryption key (EncryptedKey) element includes information defining an algorithm (EncryptionMethod Algorithm) that generates an encryption key.

In accordance with an embodiment of the present, the information defining the algorithm (EncryptionMethod Algorithm) that generates the encryption key is the AES-128 KeyWrap as set forth by the World Wide Web Consortium (W3C).

The REK information (KeyInfo) element includes Uniform Resource Identifier (URI) (RetrievalMethod URI) information that provides a method of retrieving an REK. In accordance with an embodiment of the present invention, the URI (RetrievalMethod URI) information that provides a method of retrieving the REK is defined in an REK reference (REKReference).

The encrypted seed (EncryptedSeeds) included in the cipher data (CipherData) element includes the pair of seed keys, or may include the pair of seed keys and an authentication seed associated with the DRM agent.

In addition, the cipher data (CipherData) element may additionally include a KSP reference (KSP ID) or an AVP reference (AVP ID), a seed type, a TEK reference, and a number of TEKs.

The KSP reference (KSP ID) and the AVP reference (AVP ID) may be identifiers of the KSP and the AVP, respectively. Although they are provided in different forms, they may be used for identifying a pair of seeds based on a unique scheme.

The seed type indicates whether a parameter corresponds to a seed for an encryption key or corresponds to a seed for an encryption key and an authentication key.

The TEK reference is an identifier to indicate a first TEK used for encrypting content. The TEK reference may be also used for coupling an encrypted portion of a stream and the TEK (for example, the identifier may be included in the encrypted stream).

The number of TEKs may be generated from seed values.

Although the KSP reference (KSP ID) or the AVP reference (AVP ID), the seed type, the TEK reference, and the number of TEKs included in the cipher data (CipherData) element may be transmitted in the same data structure as the encrypted seed (EncryptedSeeds), they may also be transmitted through use of a general RO payload.

FIG. 4 illustrates an encrypted seed provided in a binary data structure used for an encryption key managing method of a broadcasting service according to an embodiment of the present invention.

Referring to FIG. 4, the encrypted seed (EncryptedSeeds) are formed in a binary data structure, and include reference lengths of a KSP, an AVP, and a TEK, which are used as an encryption key, a KSP reference, an AVP reference, a TEK reference, a number of TEKs, seed type information indicating whether the encrypted seed includes the pair of seed keys, or includes the pair of seed keys and the authentication seed associated with the DRM agent, a length of the pair of seed keys, and a length of the authentication seed.

The KSP reference length defines a KSP reference length, the AVP reference length defines an AVP reference length, and the TEK reference length defines a TEK reference length.

Reserved bits refer to bits reserved for a further purpose.

The KSP reference defines a KSP reference, and the AVP reference defines an AVP reference.

The number of TEKs defines a number of TEKs generated from the AVP.

The seed type indicates whether the encrypted seed includes a pair of seed keys for an encryption key or includes a pair of seed keys for an encryption key and an authentication seed for an authentication key. When the seed type is set to '0', the seed type indicates that the pair of seed keys may be provided. When the seed key is set to '1', the seed type indicates that the pair of seed keys and the authentication seed may be provided.

The TEK reference defines a TEK reference.

The key seed length defines a length of the pair of seed keys.

A salt seed length defines a length of the authentication seed.

The encrypted seed (EncryptedSeeds) formed in the binary data structure is encoded by an XML element, and transmitted.

FIG. 5 illustrates an encrypted seed encoded by eXtensible Markup Language (XML) elements, the encrypted seed being provided in the binary data structure of FIG. 4.

Referring to FIG. 5, the encrypted seed (EncryptedSeeds) is encoded by the XML element, and is incorporated into an RO payload type defined in the DRM TS. The encrypted seed (EncryptedSeeds) includes an RI identifier (riID) including an identifier of an RI, a rights element including information associated with a right, a signature element including information associated with a signature, a time stamp element, a second encryption key (encKey) element including information associated with the encryption key, and a multicast configuration data (MulticastConfData) element including configuration information associated with encryption of a multicast.

In addition, the encrypted seed (EncryptedSeeds) encoded by the XML element may be incorporated into a rights element, as a lower element of the key information (KeyInfo) element or the first encryption key (EncryptedKey) element as defined in the rights expression language (DRM REL).

FIG. 6 illustrates an example of an encryption key (Encryptedkey) element as illustrated in FIG. 5.

Referring to FIG. 6, the second encryption key (encKey) element includes information associated with an encryption key, and includes REK information (KeyInfo) element including information associated with an REK reference, an encryption method (EncryptionMethod) element including information that defines a method of generating an encryption key, and a cipher data (CipherData) element including a KSP reference (KSP ID) or an AVP reference (AVP ID), a seed type, a TEK reference, and a number of TEKs.

FIG. 7 illustrates an example of a multicast configuration data (MulticastConfData) as illustrated in FIG. 5.

Referring to FIG. 7, the multicast configuration data (MulticastConfData) element includes a value encoded by base64 of multicast encryption configuration data.

Although, in the description above, the cipher data (CipherData) element includes the encrypted seed (EncryptedSeeds), and the encrypted seed (EncryptedSeeds) is formed in the binary data structure, as illustrated in FIG. 4, embodiments of the present invention are not limited thereto.

Alternatively, for example, the cipher data (CipherData) element may include a multicast configuration data (MulticastConfData) element formed of XML elements as illustrated in FIG. 8, instead of the encrypted seed (EncryptedSeeds).

FIG. 8 illustrates an example of a multicast configuration data (MulticastConfData) element included in a cipher data (Cipherdata) element as illustrated in FIG. 3.

Referring to FIG. 8, the multicast configuration data (MulticastConfData) element of FIG. 8 includes a KSP reference (kspReference), an AVP reference (avpReference), a TEK reference, (tekReference), a number of TEKs (numberTeks), seed type information (seedType) indicating whether the encrypted seed includes the pair of seed keys or includes the pair of seed keys and an authentication seed associated with the DRM agent, a length of the pair of seed keys (encrSeedLength), and a length of the authentication seed (authSeedLength).

FIG. 9 illustrates an example of a multicast configuration data (MulticastConfData) element included as illustrated in FIG. 8.

Referring to FIG. 9, the multicast configuration data (MulticastConfData) element is defined in a rights element, like the encrypted seed (EncryptedSeeds) encoded by the XML element.

FIG. 10 illustrates an example of an element associated with a number of Traffic Encryption Keys (TEKs) as illustrated in FIG. 9.

Referring to FIG. 10, the number of TEKs (numberTeks) is a value that is different from a negative integer, and is generated by a value of a provided seed.

FIG. 11 illustrates a data configuration of a response message used in an encryption key managing method of a broadcasting service according to an embodiment of the present invention. Specifically, FIG. 11 illustrates a data configuration of an RO response message as transmitted in step 13 of FIG. 1.

Referring to FIG. 11, unlike FIG. 3, the data of the RO response message is configured through use of a Right Encryption Language (REL) used to express an RO in the OMA DRM.

As another example, the data configuration of the RO response message may include a context element, an inherit element, and the like, as an content element identifying an RO associated with content, and may include a multicast configuration data (MulticastconfData) element including information associated with an encryption key of content transmitted by a multicast.

FIG. 12 illustrates an example of a multicast configuration data (MulticastConfData) element included as illustrated in FIG. 11.

Referring to FIG. 12, the multicast configuration data (MulticastconfData) element includes a value obtained by encoding, based on a base64 scheme, configuration data that generates and uses TEKs. The multicast configuration data (MulticastconfData) element may be formed in the binary data structure, and may include reference lengths of a KSP, an AVP, and a TEK which are used as encryption keys, a KSP reference, an AVP reference, a TEK reference, a number of TEKs, seed type information indicating whether the encrypted seed includes the pair of seed keys or includes the pair of seed keys and an authentication seed associated with the DRM agent, a length of the pair of seed keys, and a length of the authentication seed. For example, the multicast configuration data (MulticastconfData) element may be configured as illustrated in FIG. 4.

In addition, when the provided key generating method is compulsory for supporting DRM 2.2, supporting of the algorithm may be signaled by a version of a specification. Conversely, supporting may be determined through use of the extension of a Device Hello message and an RI Hello message.

FIG. 13 illustrates an example of a signaling used in an encryption key managing method of a broadcasting service according to an embodiment of the present invention. Specifically, FIG. 13 illustrates a signaling indicating whether the key generating method is used through use of a version of a specification.

Referring to FIG. 13, presence information of a multicast key generation (MulticastKeyGeneration) element included in an extension field of the Device Hello and RI Hello message may be used to indicate whether the key generating method is supported.

FIG. 14 illustrates another example of a signaling used in an encryption key managing method of a broadcasting service according to an embodiment of the present invention. Specifically, FIG. 14 illustrates a signaling indicating whether the key generating method is used through use of the Device Hello and the RI Hello message.

Referring to FIG. 14, the multicast key generation (MulticastKeyGeneration) element in the Device Hello message may include an identifier of a hash function to be used for generating a key.

FIG. 15 illustrates another example of a signaling used in an encryption key managing method of a broadcasting service according to an embodiment of the present invention. Specifically, FIG. 15 illustrates how the RI Hello message may be provided.

The DRM agent 101 determines information required for generating an encryption key from an RO response message received in step 13, and generates an encryption key for using content provided through the broadcasting service.

When the RO response message, e.g., of FIG. 3, is received, the DRM agent 101 determines an identifier of the content from the content element, and determines, from the key information element, a first encryption key element including information associated with the encryption key, an REK information element including information associated with an REK reference, and a cipher data element including an encrypted seed. Also, the DRM agent 101 determines, from the key information element, a pair of seed keys included in the encryption key, the pair of seed keys including a first key and a second key, which are different from each other. For example, when the DRM agent 101 corresponds to a subscriber DRM agent 101, a KSP may be determined, and when the DRM agent 101 corresponds to a DRM agent 101 that supports the PPV, an AVP may be determined.

When determining the pair of seed keys, an authentication seed for authenticating the DRM agent 101 may be further determined. That is, the DRM agent 101 may further determine the authentication seed associated with the DRM agent in addition to the pair of seed keys, from the encrypted seed included in the cipher data element.

In addition, the pair of seed keys may be included, as a binary data structure, in the encrypted seed that is included in the cipher data (CipherData) element, as illustrated in FIG. 4, and may be received. Therefore, the DRM agent 101 determines, from information included in the encrypted seed as a binary data structure, reference lengths of a KSP, an AVP, and a TEK, which are used as an encryption key, a KSP reference, an AVP reference, a TEK reference, a number of TEKs, seed type information indicating whether the encrypted seed includes the pair of seed keys or includes the pair of seed keys and the authentication seed associated with the DRM agent, a length of the pair of seed keys, a length of the authentication seed, and the like, so as to determine the pair of seed keys.

The encrypted seed included in the cipher data (CipherData) element may be encoded by an XML element and received as illustrated in FIG. 5. For example, to determine the pair of seed keys, the DRM agent 101 determines an RI identifier (riID) element including an identifier of a RI, a rights element including information associated with a right, a signature element including information associated with a signature, a time stamp element, a second encryption key (encKey) element including information associated with the encryption key, a multicast configuration data (MulticastConfData) element including configuration information of encryption of a multicast, etc., in order to determine the encrypted seed (EncryptedSeeds). Also, the pair of seed keys may be determined through use of the information included in the encrypted seed (EncryptedSeeds).

The DRM agent 101 may receive the RO response message including the cipher data (CipherData) element including a multicast configuration data (MulticastConfData) element formed of XML elements as illustrated in FIG. 8, as opposed to the encrypted seed (EncryptedSeeds). Therefore, the DRM agent 101 may determine a value contained in the multicast configuration data (MulticastConfData) element formed of XML elements included in the cipher data (CipherData) element, in order to determine the pair of seed keys. That is, the DRM agent 101 determines a KSP reference (kspReference), an AVP reference (avpReference), and a TEK reference (tekReference), a number of TEKs, seed type information (seedType) indicating whether the encrypted seed includes the pair of seed keys or includes the pair of seed keys and an authentication seed associated with the DRM agent, a length of the pair of seed keys (encrSeedLength), and a length of the authentication seed included in the multicast configuration data (MulticastConfData) element formed of the XML elements, in order to determine the pair of seed keys.

Also, unlike FIG. 3, the RO response message may be configured through use of an REL used for expressing an RO in the OMA DRM, and the DRM agent 101 may receive the RO response message configured through use of the REL. For example, the DRM agent 101 determines a context element and an inherit element included as a content element for identifying an RO associated with content, and the multicast configuration data (MulticastconfData) element including information associated with an encryption key of content transmitted through a multicast, in order to determine the pair of seed keys. In particular, the pair of seed keys required for generating the encryption key are determined by determining reference lengths of a KSP, an AVP, and a TEK, a KSP reference, an AVP reference, a TEK reference, a number of TEKs, seed type information indicating whether the encrypted seed includes the pair of seed keys or includes the pair of seed keys and an authentication seed associated with the DRM agent, a length of the pair of seed keys, a length of the authentication seed, and the like included in the multicast configuration data (MulticastconfData) element formed in the binary data structure.

When the pair of seed keys is determined, the encryption key is detected through use of the pair of seed keys. That is, the DRM agent 101 that determines the KSP calculates BHPs by applying a forward directional hash chain and a reverse directional hash chain to KS1 and KS2, and calculates n TEKs through use of predetermined operations with respect to the BHPs. Also, the DRM agent 101 that determines an AVP may apply a forward directional hash chain and a reverse directional hash chain to the pair of seed keys, i.e., n pairs of (Si, Mi), in order to calculate S={Si, Si+1, Si+2, ... Sj−1, Sj}, M={Mj−1, Mj−2, ... , Mi+1, Mi}, and may perform an XOR operation with respect to the calculated values so as to calculate m TEKs from TEKi to TEKj.

Figure 16:
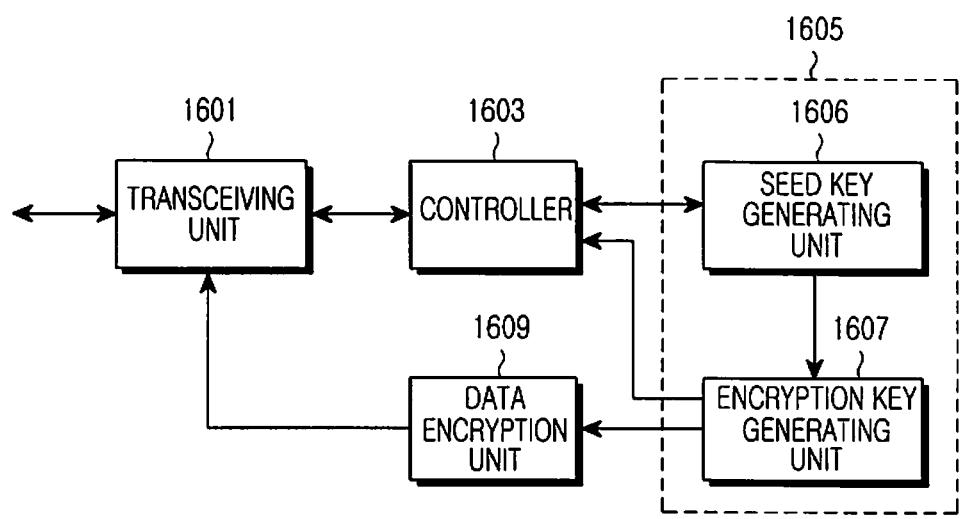
FIG. 16 is a block diagram illustrating a configuration of a Rights Issuer (RI) according to an embodiment of the present invention.

FIG. 16 is a block diagram illustrating a configuration of an RI according to an embodiment of the present invention.

Referring to FIG. 16, the RI includes a transceiving unit 1601, a controller 1603, an encryption key managing unit 1605, and a data encryption unit 1609.

The transceiving unit 1601 receives a message requesting an RO, e.g., an RO (ROAP-ROrequest) message, from a DRM agent, and transfers the received message to the controller 1603. The controller 1603 determines, based on information included in the received RO request message, whether the corresponding DRM agent is a subscriber DRM agent or a DRM agent that supports the PPV, and controls a seed key generating unit 1606 of the encryption key managing unit 1605 based on a result of the determination. The controller 1603 generates a trigger message indicating an issuing by the RI, e.g., an RO acquisition trigger (ROAP-ROAcquisitionTrigger) message, transfers the trigger message to the transceiving unit 1601, and requests transmitting to the DRM agent.

The encryption key managing unit 1605 generates a seed key appropriate for a type of the corresponding DRM agent by the controlling of the controller 1603, and generates an encryption key, i.e., a TEK, through use of the generated seed key. More specifically, the encryption key managing unit 1605 includes the seed key generating unit 1606 and an encryption key generating unit 1607. The seed key generating unit 1606 generates a seed key appropriate for a type of the corresponding DRM agent. That is, when the DRM agent is a subscriber DRM agent, a KSP may be generated. When the DRM agent is a DRM agent that supports the PPV, an AVP may be generated. The generated KSP or AVP are transferred to the controller 1603 and the encryption key generating unit 1607.

The encryption key generating unit 1607 that receives the KSP or the AVP generates TEKs through use of the KSP or the AVP, and a number of the generated TEKs correspond to an expiration date of the KSP or the AVP. That is, when then DRM agent is a subscriber DRM agent, n TEKs may be generated through use of the KSP. When the DRM agent is a DRM agent that supports the PPV, m TEKs may be generated through use of the AVP. The method of generating TEKs from the KSP or the AVP may use a forward directional hash chain and a reverse directional hash chain as described above in the encryption key managing method, and detailed descriptions thereof will be omitted here.

The TEKs are transferred from the encryption key generating unit 1607 to the controller 1603 and the data encryption unit 1609. The data encryption unit 1609 encrypts data through use of the TEKs, and transmits the encrypted data to a terminal though the transceiving unit 1601.

In addition, the controller 1603 generates a response message including a KSP or an AVP, and a TEK provided from the encryption key managing unit 1605, and transmits the generated response message to the DRM agent through the transceiving unit 1601. Here, the controller 1603 may generate the response message based on the encryption key managing method and thus, the detailed process thereof may be understood based on the response message generating process of the encryption key managing method described above.

Figure 17:
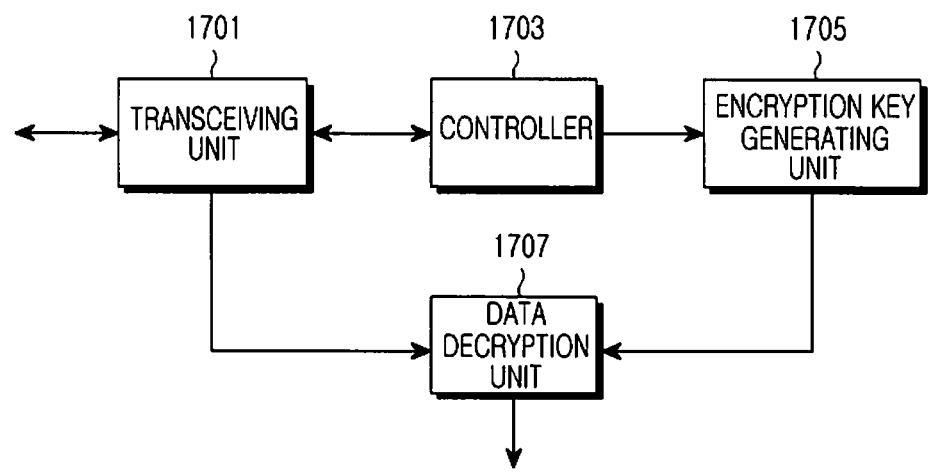
FIG. 17 is a block diagram illustrating a configuration of a DRM agent according to an embodiment of the present invention.

FIG. 17 is a block diagram illustrating a configuration of a DRM agent according to an embodiment of the present invention.

Referring to FIG. 17, the DRM agent includes a transceiving unit 1701, a controller 1703, an encryption key generating unit 1705, and a data decryption unit 1707.

The controller 1703 generates a message requesting an RO of the corresponding DRM, e.g., an RO request (ROAP-ROrequest) message, transfers the message to an RI through use of the transceiving unit 1701, and receives a pair of seed keys, i.e., a response message including a KSP or an AVP, through the transceiving unit 1701, in response to the RO request message. The controller 1703 detects the KSP or the AVP included in the response message, and transfers the KSP or the AVP to the encryption key generating unit 1705. Here, an operation in which the controller 1703 detects a seed key included in the response message may be performed based on the encryption key managing method i.e., the process of determining the pair of seed keys from the response message in the encryption key managing method as described above.

The encryption key generating unit 1705 generates TEKs using the received KSP or AVP, wherein a number of the generated TEKs corresponds to an expiration date of the KSP or the AVP, and transfers the generated TEKs to the data decryption unit 1707.

When the transceiving unit 1701 receives encrypted data from a network, the transceiving unit 1701 transfers the encrypted data to the data decryption unit 1707. The data decryption unit 1707 decrypts the encrypted data using the TEKs transferred from the encryption generating unit 1705, and outputs the decrypted data.

While the present invention has been shown and described with reference to certain embodiments thereof, it will be understood by those skilled in the art that various changes in form and details may be made therein without departing from the spirit and scope of the present invention as defined by the appended claims and their equivalents.

The invention claimed is:

1. A method for a Rights Issuer (RI) to manage an encryption key to selectively provide content to a Digital Rights Management (DRM) agent in a broadcasting service that transmits the content to a plurality of DRM agents, the method comprising:
   receiving, from the DRM agent, a message requesting a rights object for receiving the content divided into at least one section;
   generating a Key Seed Pair (KSP) including a first key and a second key;
   generating at least one encryption key associated with each of the at least one section based on the KSP; and
   transmitting, to the DRM agent, a response message including a context element including an identifier of the content and a key information element including an encrypted seed,
   wherein the encrypted seed includes at least one of the KSP, an authentication seed and seed type information indicating whether the encrypted seed includes the KSP, or includes the KSP and the authentication seed,
   wherein the authentication seed is used to authenticate the DRM agent,
   wherein the encrypted seed includes a multicast configuration data element including configuration information associated with encryption of a multicast, and a value obtained by encoding the configuration information associated with encryption of the multicast,
   wherein the encrypted seed is formed in a binary data structure, and wherein the encrypted seed further includes at least one of a reference length of the KSP, a reference length of an Access Valid Pair (AVP), and a Traffic Encryption Key (TEK) that are used as the at least one encryption key, a KSP reference, an AVP reference, a TEK reference, a number of TEKs, a length of the KSP, and a length of the authentication seed, and
   wherein the generating the at least one encryption key comprises generating the TEKs using the generated KSP, wherein a number of the generated TEKs corresponds to an expiration date of the KSP.

2. The method of claim 1, wherein the encrypted seed is formed of eXtensible Markup Language (XML) elements, and wherein the encrypted seed further includes at least one of an RI identifier element including an identifier of the RI, a rights element including information associated with a right, a signature element including information associated with a signature, a time stamp element, and a second encryption key element including information associated with the at least one encryption key.

3. The method of claim 2, wherein the multicast configuration data element is formed of XML elements, and wherein the multicast configuration data element further includes at least one of a KSP reference, an AVP reference, a TEK reference, a number of TEKs, a length of the KSP, and a length of the authentication seed.

4. The method of claim 1, wherein the key information element further includes at least one of a first encryption key element including information associated with the at least one encryption key, a rights encryption key information element including information associated with a reference of a rights encryption key, and a cipher data element including the encrypted seed.

5. The method of claim 4, wherein the encrypted seed is included in the first encryption key element that includes the at least one encryption key.

6. A method for a Rights Issuer (RI) to manage an encryption key to selectively provide content to a Digital Rights Management (DRM) agent in a broadcasting service that transmits the content to a plurality of DRM agents, the method comprising:
   receiving, from the DRM agent, a message requesting a rights object for receiving the content divided into at least one section;
   generating a Key Seed Pair (KSP) including a first key and a second key;
   generating at least one encryption key associated with each of the at least one section based on the KSP; and
   transmitting, to the DRM agent, a response message including a context element including information associated with a rights object corresponding to the content and a multicast configuration data element including information associated with the at least one encryption key of the content transmitted by a multicast, through use of a rights encryption language,
   wherein the multicast configuration data element includes an encrypted seed,
   wherein the encrypted seed includes at least one of the KSP, an authentication seed and seed type information indicating whether the encrypted seed includes the KSP, or includes the KSP and the authentication seed,
   wherein the authentication seed is used to authenticate the DRM agent, and
   wherein the encrypted seed includes a multicast configuration data element including configuration information associated with encryption of a multicast, and a value obtained by encoding the configuration information associated with encryption of the multicast,
   wherein the encrypted seed is formed in a binary data structure, and wherein the encrypted seed further includes at least one of a reference length of the KSP, a reference length of an Access Valid Pair (AVP), and a Traffic Encryption Key (TEK) that are used as the at least one encryption key, a KSP reference, an AVP reference, a TEK reference, a number of TEKs, a length of the KSP, and a length of the authentication seed, and
   wherein the generating the at least one encryption key comprises generating the TEKs using the generated KSP, wherein a number of the generated TEKs corresponds to an expiration date of the KSP.

7. A method for a Digital Rights Management (DRM) agent to manage an encryption key provided from a Rights Issuer (RI) to use encrypted content in a broadcasting service that transmits content to a plurality of DRM agents, the method comprising:
   transmitting, to the RI, a message requesting a rights object for receiving the content divided into at least one section;
   receiving, from the RI, a response message including a context element including an identifier of the content and a key information element including encryption key information;
   determining the identifier of the content from the context element;
   determining, from the key information element, a first encryption key element including information associated with the encryption key, a rights encryption key information element including information associated with a rights encryption key reference, and a cipher data element including an encrypted seed;

determining, from the key information element, a Key Seed Pair (KSP) included in the encryption key, the KSP including a first key and a second key, which are different from each other; and decrypting at least one encryption key associated with each of the at least one section, wherein the encrypted seed includes at least one of the KSP, an authentication seed and seed type information indicating whether the encrypted seed includes the KSP, or includes the KSP and the authentication seed, wherein the authentication seed is used to authenticate the DRM agent, wherein the encrypted seed includes a multicast configuration data element including configuration information associated with encryption of a multicast, and a value obtained by encoding the configuration information associated with encryption of the multicast, and wherein the encrypted seed is formed in a binary data structure, and wherein the encrypted seed further includes at least one of a reference length of the KSP, a reference length of an Access Valid Pair (AVP), and a Traffic Encryption Key (TEK) that are used as the at least one encryption key, a KSP reference, an AVP reference, a TEK reference, a number of TEKs, a length of the KSP, and a length of the authentication seed, wherein the decrypting at least one encryption key comprises:

detecting the KSP included in the response message, and generating the TEKs using the detected KSP, wherein a number of the generated TEKs corresponds to an expiration date of the KSP.

8. The method of claim 7, wherein determining the KSP comprises:

determining, from the encrypted seed, which is formed of eXtensible Markup Language (XML) elements, at least one of an RI identifier element including an identifier of the RI, a rights element including information associated with a right, a signature element including information associated with a signature, a time stamp element, and a second encryption key element including information associated with the at least one encryption key.

9. The method of claim 8, wherein determining the KSP further comprises:

determining, from the multicast configuration data element formed of the XML elements, at least one of a KSP reference, an AVP reference, a TEK reference, a number of TEKs, a length of the KSP, and a length of the authentication seed.

10. A method for a Digital Rights Management (DRM) agent to manage an encryption key provided from a Rights Issuer (RI), to use encrypted content in a broadcasting service that transmits content to a plurality of DRM agents, the method comprising:

transmitting, to the RI, a message requesting a rights object for receiving the content divided into at least one section;

receiving, from the RI, a response message including a context element including information associated with a rights object corresponding to the content and a multicast configuration data element including information associated with an encryption key of the content transmitted by a multicast, through use of a rights encryption language;

determining an identifier of the content from the context element;

determining information associated with the encryption key of the content transmitted by the multicast from the multicast configuration data element;

determining a Key Seed Pair (KSP) included in the multicast configuration data element, the KSP including a first key and a second key, which are different from each other; and decrypting at least one encryption key associated with each of the at least one section, wherein the multicast configuration data element includes an encrypted seed, wherein the encrypted seed includes at least one of the KSP, an authentication seed and seed type information indicating whether the encrypted seed includes the KSP, or includes the KSP and the authentication seed, wherein the authentication seed is used to authenticate the DRM agent, and wherein the encrypted seed includes a multicast configuration data element including configuration information associated with encryption of a multicast, and a value obtained by encoding the configuration information associated with encryption of the multicast, wherein the encrypted seed is formed in a binary data structure, and wherein the encrypted seed further includes at least one of a reference length of the KSP, a reference length of an Access Valid Pair (AVP), and a Traffic Encryption Key (TEK) that are used as the at least one encryption key, a KSP reference, an AVP reference, a TEK reference, a number of TEKs, a length of the KSP, and a length of the authentication seed, wherein the decrypting at least one encryption key comprises:

detecting the KSP included in the response message, and generating the TEKs using the detected KSP, wherein a number of the generated TEKs corresponds to an expiration date of the KSP.

* * * * *